United States Patent
Fukushima et al.

(10) Patent No.: US 10,614,849 B2
(45) Date of Patent: Apr. 7, 2020

(54) HEAT-ASSISTED MAGNETIC RECORDING MEDIUM AND MAGNETIC STORAGE APPARATUS

(71) Applicant: SHOWA DENKO K.K., Tokyo (JP)

(72) Inventors: Takayuki Fukushima, Chiba (JP); Koji Take, Chiba (JP); Hisato Shibata, Chiba (JP); Takehiro Yamaguchi, Chiba (JP); Tomoo Shige, Chiba (JP); Lei Zhang, Chiba (JP); Chen Xu, Chiba (JP); Yuji Umemoto, Chiba (JP); Hiroshi Koyanagi, Chiba (JP); Kazuya Niwa, Chiba (JP); Tetsuya Kanbe, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 16/519,157

(22) Filed: Jul. 23, 2019

(65) Prior Publication Data

US 2020/0075053 A1  Mar. 5, 2020

(30) Foreign Application Priority Data

Aug. 29, 2018 (JP) .................................. 2018-160219

(51) Int. Cl.
*G11B 5/65* (2006.01)
*G11B 11/105* (2006.01)
(Continued)

(52) U.S. Cl.
CPC .......... *G11B 11/10536* (2013.01); *G11B 5/65* (2013.01); *G11B 5/653* (2013.01); *G11B 5/656* (2013.01); *G11B 5/66* (2013.01); *G11B 5/68* (2013.01); *G11B 5/7013* (2013.01); *G11B 5/714* (2013.01); *G11B 5/716* (2013.01); *G11B 5/73915* (2019.05); *G11B 5/73917* (2019.05);
(Continued)

(58) Field of Classification Search
None
See application file for complete search history.

(56) References Cited

U.S. PATENT DOCUMENTS 8,509,039 B1 * 8/2013 Huang ..................... G11B 5/65
                                                              369/13.02
8,721,903 B2 * 5/2014 Bian ......................... G11B 5/65
                                                              216/22

(Continued)

FOREIGN PATENT DOCUMENTS

JP    2016-194147    11/2016

*Primary Examiner* — William J Klimowicz
(74) *Attorney, Agent, or Firm* — IPUSA, PLLC

(57) ABSTRACT

A heat-assisted magnetic recording medium includes a substrate, an underlayer, and a magnetic layer including an alloy having a $L1_0$ crystal structure and first and second layers, arranged in this order. Each of the first and second layers has a granular structure including C, $SiO_2$, and BN at grain boundaries. Vol % of the grain boundaries in each of the first and second layers is 25 to 45 vol %. Vol % of C in the first layer is 5 to 22 vol %, and a volume ratio of $SiO_2$ with respect to BN in each of the first and second layers is 0.25 to 3.5. Vol % of $SiO_2$ in the second layer is greater than that of the first layer by 5 vol % or more. Vol % of BN in the second layer is smaller than that in the first layer by 2 vol % or more.

9 Claims, 2 Drawing Sheets

(51) Int. Cl.
    *G11B 5/73*     (2006.01)
    *G11B 11/24*    (2006.01)
    *G11B 5/716*    (2006.01)
    *G11B 5/68*     (2006.01)
    *G11B 5/714*    (2006.01)
    *G11B 5/66*     (2006.01)
    *G11B 5/70*     (2006.01)
    *G11B 5/00*         (2006.01)

(52) U.S. Cl.
    CPC ...... *G11B 11/24* (2013.01); *G11B 2005/0021* (2013.01)

(56) References Cited

U.S. PATENT DOCUMENTS

| | | | |
|---|---|---|---|
| 9,530,445 B1* | 12/2016 | Grobis | G11B 5/7379 |
| 9,601,144 B1* | 3/2017 | Mehta | G11B 5/66 |
| 9,824,710 B1* | 11/2017 | Yuan | G11B 5/7325 |
| 10,553,242 B2* | 2/2020 | Zhang | G11B 5/653 |
| 2018/0211688 A1* | 7/2018 | Fukushima | G11B 5/7325 |
| 2018/0261245 A1* | 9/2018 | Niwa | G11B 5/73 |
| 2018/0350399 A1* | 12/2018 | Zambano | G11B 5/70673 |
| 2019/0392863 A1* | 12/2019 | Fukushima | G11B 5/656 |
| 2020/0005821 A1* | 1/2020 | Zhang | G11B 5/66 |

* cited by examiner

HEAT-ASSISTED MAGNETIC RECORDING MEDIUM AND MAGNETIC STORAGE APPARATUS

CROSS-REFERENCE TO RELATED APPLICATIONS

This application is based upon and claims priority to Japanese Patent Application No. 2018-160219, filed on Aug. 29, 2018, the entire contents of which are incorporated herein by reference.

BACKGROUND OF THE INVENTION

1. Field of the Invention

The present invention relates to a heat-assisted magnetic recording medium, and a magnetic storage apparatus including the heat-assisted magnetic recording medium.

2. Description of the Related Art

Recently, the heat-assisted magnetic recording method is gathering attention as one of the next-generation recording methods which can realize a high surface recording density of approximately 2 Tbit/inch$^2$ or higher. The heat-assisted magnetic recording method irradiates near-field light on the magnetic recording medium to locally heat the surface of the magnetic recording medium and assist the recording. The heat-assisted magnetic recording method records information on the magnetic recording medium in a state where the coercivity of the magnetic recording medium is locally reduced. When the heat-assisted magnetic recording method is used, it is possible to easily record the information on the magnetic recording medium having a coercivity of several tens of kOe at room temperature by a recording magnetic field of the magnetic head. For this reason, a material having a high magnetocrystalline anisotropy constant Ku, that is, a high-Ku material, may be used for a magnetic recording layer of the magnetic recording medium, and as a result, magnetic grains can be refined while maintaining thermal stability. Examples of known high-Ku materials include alloys having a $L1_0$ crystal structure, such as Fe—Pt alloys having a Ku of approximately $7\times10^6$ J/m$^3$, Co—Pt alloys having a Ku of approximately $5\times10^6$ J/m$^3$, or the like.

As an example, exemplary implementations 15 and 18 of Japanese Laid-Open Patent Publication No. 2016-194147 describe 27Fe-27Pt-6Ge-10BN-30C (at %) and 27Fe-27Pt-6Ge-6SiP$_2$-34C (at %) as examples of the alloy having the $L1_0$ crystal structure and included in the magnetic layer.

In order to increase the surface recording density of the heat-assisted magnetic recording medium, it is necessary to increase the electromagnetic conversion characteristic of the heat-assisted magnetic recording medium.

However, when forming the magnetic layer including the alloy having the $L1_0$ crystal structure, a substrate needs to be heated to a temperature of 300° C. to 650° C. For this reason, when a content of a grain boundary segregation material in the magnetic layer is small, the magnetic grains cannot be refined, and an arithmetic average roughness of the heat-assisted magnetic recording medium becomes large, to deteriorate the electromagnetic conversion characteristic of the heat-assisted magnetic recording medium. On the other hand, when the content of the grain boundary segregation material in the magnetic layer is large, the grain boundary segregation material diffuses into the magnetic grains, and the coercivity of the heat-assisted magnetic recording medium decreases, to deteriorate the electromagnetic conversion characteristic of the heat-assisted magnetic recording medium.

Further, the surface of the magnetic layer including the alloy having the $L1_0$ crystal structure is locally heated when recording the information on the heat-assisted magnetic recording medium. Accordingly, if a heat dissipation of the magnetic layer including the alloy having the $L1_0$ crystal structure is low, the electromagnetic conversion characteristic of the heat-assisted magnetic recording medium deteriorates.

SUMMARY OF THE INVENTION

Embodiments of the present invention can provide a heat-assisted magnetic recording medium having an excellent electromagnetic conversion characteristic, and a magnetic storage apparatus including the heat-assisted magnetic recording medium.

According to one aspect of embodiments of the present invention, a heat-assisted magnetic recording medium including a substrate, an underlayer, and a magnetic layer including an alloy having a $L1_0$ crystal structure, which are arranged in this order, wherein the magnetic layer includes a first magnetic layer, and a second magnetic layer which is arranged farther away from the substrate than the first magnetic layer, wherein each of the first magnetic layer and the second magnetic layer has a granular structure including C, SiO$_2$, and BN at grain boundaries, wherein a volume fraction of the grain boundaries in each of the first magnetic layer and the second magnetic layer is within a range of 25 vol % to 45 vol %, wherein a volume fraction of C in the first magnetic layer is within a range of 5 vol % to 22 vol %, wherein a volume ratio of SiO$_2$ with respect to BN in each of the first magnetic layer and the second magnetic layer is within a range of 0.25 to 3.5, wherein a volume fraction of SiO$_2$ in the second magnetic layer is greater than a volume fraction of SiO$_2$ in the first magnetic layer by 5 vol % or more, and wherein a volume fraction of BN in the second magnetic layer is smaller than a volume fraction of BN in the first magnetic layer by 2 vol % or more.

According to another aspect of the embodiments of the present invention, a magnetic storage apparatus includes the heat-assisted magnetic recording medium referred above, and a magnetic head configured to write information to and read information from the magnetic recording medium.

Other objects and further features of the present invention will be apparent from the following detailed description when read in conjunction with the accompanying drawings.

DESCRIPTION OF THE PREFERRED EMBODIMENTS

Figure 1:
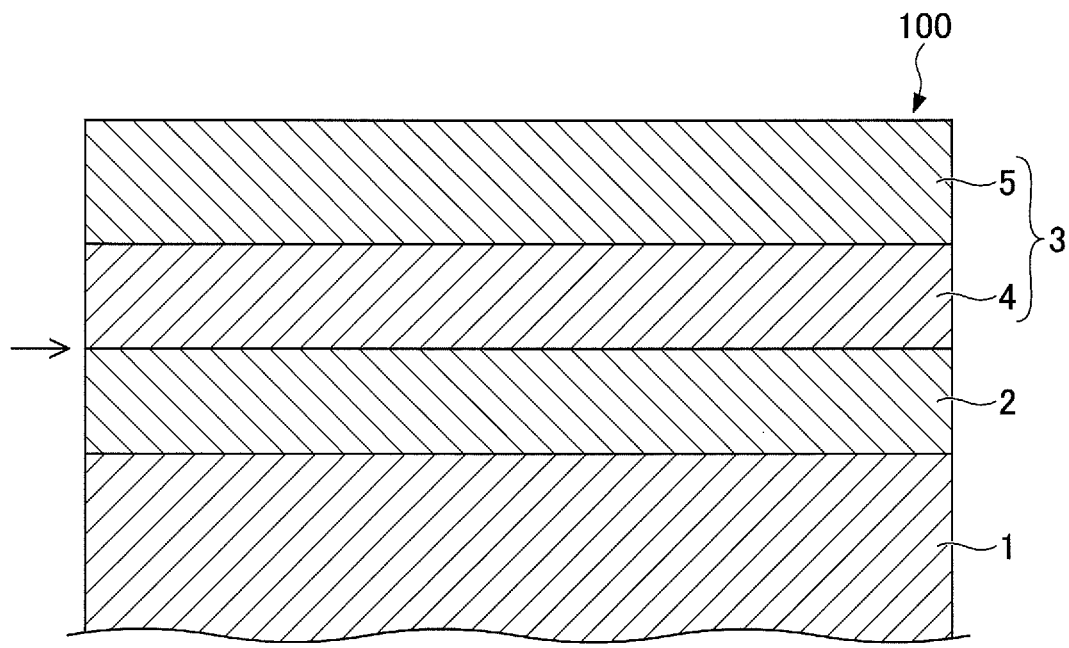
FIG. 1 is a cross sectional view illustrating an example of a layer structure of a heat-assisted magnetic recording medium according to one embodiment of the present invention.

Embodiments and exemplary implementations of a heat-assisted magnetic recording medium and a magnetic storage apparatus according to the present invention will be described, by referring to the drawings. In each of the embodiments, the configuration, arrangements or positions, materials, and amounts (at % or mol %) of elements used in the heat-assisted magnetic recording medium or the magnetic storage apparatus may be appropriately modified, unless indicated otherwise. Further, some constituent elements may be illustrated on an enlarged scale, and the scale may not be the same for all constituent elements illustrated in the drawings.

[Heat-Assisted Magnetic Recording Medium]

FIG. 1 is a cross sectional view illustrating an example of a heat-assisted magnetic recording medium according to one embodiment of the present invention.

A heat-assisted magnetic recording medium 100 includes a substrate 1, an underlayer 2, and a magnetic layer 3 having a $L1_0$ crystal structure, which are arranged in this order. The magnetic layer 3 includes a first magnetic layer 4, and a second magnetic layer 5 which is arranged farther away from the substrate 1 than the first magnetic layer 4. Each of the first magnetic layer 4 and the second magnetic layer 5 has a granular structure including C, $SiO_2$, and BN at grain boundaries.

A volume fraction of the grain boundaries in each of the first magnetic layer 4 and the second magnetic layer 5 is within a range of 25 vol % to 45 vol %, and more preferably within a range of 33 vol % to 45 vol %. When the volume fraction of the grain boundaries in each of the first magnetic layer 4 and the second magnetic layer 5 is less than 25 vol %, the magnetic grains cannot be refined, and an arithmetic average roughness of the heat-assisted magnetic recording medium 100 becomes large, to deteriorate the electromagnetic conversion characteristic of the heat-assisted magnetic recording medium 100. On the other hand, when the volume fraction of the grain boundaries in each of the first magnetic layer 4 and the second magnetic layer 5 exceeds 45 vol %, the material forming the grain boundaries diffuses into the magnetic grains, and the coercivity of the heat-assisted magnetic recording medium 100 decreases, to deteriorate the electromagnetic conversion characteristic of the heat-assisted magnetic recording medium 100.

A volume fraction of C in the first magnetic layer 4 is within a range of 5 vol % to 22 vol %, and more preferably within a range of 8 vol % to 15 vol %. When the volume fraction of C in the first magnetic layer 4 is less than 5 vol %, the grain boundary segregation material diffuses into the magnetic grains, the coercivity of the heat-assisted magnetic recording medium 100 decreases or the magnetic grains cannot be refined, and the arithmetic average roughness of the heat-assisted magnetic recording medium 100 becomes large, to deteriorate the electromagnetic conversion characteristic of the heat-assisted magnetic recording medium 100. On the other hand, when the volume fraction of C in the first magnetic layer 4 exceeds 22 vol %, the magnetic grains cannot be refined, and the arithmetic average roughness of the heat-assisted magnetic recording medium 100 becomes large, to deteriorate the electromagnetic conversion characteristic of the heat-assisted magnetic recording medium 100.

A volume ratio of $SiO_2$ with respect to BN in each of the first magnetic layer 4 and the second magnetic layer 5 is within a range of 0.25 to 3.5, and more preferably within a range of 0.3 to 1. When the volume ratio of $SiO_2$ with respect to BN in each of the first magnetic layer 4 and the second magnetic layer 5 is less than 0.25, or exceeds 3.5, the magnetic grains cannot be refined, and the arithmetic average roughness of the heat-assisted magnetic recording medium 100 becomes large, to deteriorate the electromagnetic conversion characteristic of the heat-assisted magnetic recording medium 100.

A volume fraction of $SiO_2$ in the second magnetic layer 5 is greater than a volume fraction of $SiO_2$ in the first magnetic layer 4 by 5 vol % or more, and more preferably 8 vol % or more. When the volume fraction of $SiO_2$ in the second magnetic layer 5 is not greater than the volume fraction of $SiO_2$ in the first magnetic layer 4 by 5 vol % or more, a heat dissipation of the magnetic layer 3 becomes low, and the electromagnetic conversion characteristic of the heat-assisted magnetic recording medium 100 deteriorates, because a heat conductivity of $SiO_2$ is low.

A volume fraction of BN in the second magnetic layer 5 is smaller than a volume fraction of BN in the first magnetic layer 4 by 2 vol % or more, and more preferably 5 vol % or more. When the volume fraction of BN in the second magnetic layer 5 is not smaller than the volume fraction of BN in the first magnetic layer 4 by 2 vol % or more, the heat dissipation of the magnetic layer 3 becomes low, and the electromagnetic conversion characteristic of the heat-assisted magnetic recording medium 100 deteriorates, because the heat conductivity of NB is high.

Each of the first magnetic layer 4 and the second magnetic layer 5 has a thickness of 2 nm or greater, and more preferably 3 nm or greater. When each of the first magnetic layer 4 and the second magnetic layer 5 has the thickness of 2 nm or greater, a reproducing output of the heat-assisted magnetic recording medium 100 improves. An upper limit of the thickness of each of the first magnetic layer 4 and the second magnetic layer 5 is not limited to a particular value, however, may be 20 nm, for example.

The second magnetic layer 5 preferably has a thickness smaller than that of the first magnetic layer 4. In this case, the heat dissipation of the magnetic layer 3 improves, and the electromagnetic conversion characteristic of the heat-assisted magnetic recording medium 100 improves.

The alloy having the $L1_0$ crystal structure, included in the magnetic layer 3, includes one or more metals selected from a group consisting of Rh, Ru, Ir, and Cu, within a range of 2 mol % to 10 mol %, and more preferably within a range of 2.5 mol % to 7.5 mol %. When the alloy having the $L1_0$ crystal structure, included in the magnetic layer 3, includes one or more metals selected from the group consisting of Rh, Ru, Ir, and Cu, within the range of 2 mol % to 10 mol %, an ordering of the alloy having the $L1_0$ crystal structure improves, and the electromagnetic conversion characteristic of the heat-assisted magnetic recording medium 100 improves.

The substrate 1 may be made of a suitable known material.

When manufacturing the heat-assisted magnetic recording medium 100, the substrate 1 may need to be heated to a temperature of 500° C. or higher. For this reason, the substrate 1 is preferably made of a heat-resisting glass having a softening temperature of 500° C. or higher, and more preferably 600° C. or higher.

The underlayer 2 may be made of a suitable known material which causes a (001) orientation of the magnetic layer 3 having the $L1_0$ crystal structure. For example, the underlayer 2 may be made of a material having a (100) orientation, such as W, MgO, or the like.

In addition, the underlayer 2 may have a multi-layer structure. In this case, a lattice mismatch (or lattice misfit) among a plurality of layers forming the underlayer 2 having the multi-layer structure is preferably 10% or less.

The underlayer 2 having the multi-layer structure may a W layer and a MgO layer which are stacked.

Further, in order to cause the (100) orientation of the underlayer 2, a layer made of Cr, an alloy including Cr and having a Body Centered Cubic (BCC) crystal structure, or an alloy having a B2 crystal structure, may be arranged between the substrate 1 and the underlayer 2.

Examples of the alloy including Cr and having the BCC crystal structure, arranged between the substrate 1 and the underlayer 2, include Cr—Mn alloys, Cr—Mo alloys, Cr—W alloys, Cr—V alloys, Cr—Ti alloys, Cr—Ru alloys, or the like, for example.

Examples of the alloy having the B2 crystal structure, arranged between the substrate 1 and the underlayer 2, include Ru—Al alloys, Ni—Al alloys, or the like, for example.

Examples of the alloy having the $L1_0$ crystal structure, included in the magnetic layer 3, include Fe—Pt magnetic alloys, Co—Pt magnetic alloys, or the like, for example.

The heat-assisted magnetic recording medium 100 preferably includes a protection layer (not illustrated) arranged on the magnetic layer 3. Examples of a material forming the protection layer include hard carbon, or the like, for example.

The method of forming the protection layer is not limited to a particular method. Examples of the method of forming the protection layer include a Radio Frequency-Chemical Vapor Deposition (RF-CVD), an Ion Beam Deposition (IBD), a Filtered Cathodic Vacuum Arc (FCVA), or the like, for example. The RF-CVD decomposes a source gas made of hydrocarbon by high-frequency plasma to deposit the protection layer. The IBD ionizes the source gas by electrons emitted from a filament to deposit the protection layer. The FCVA deposits the protection layer using a solid carbon target, without using a source gas.

The protection layer preferably has a thickness in a range of 1 nm to 6 nm. When the thickness of the protection layer is 1 nm or greater, floating properties of a magnetic head become satisfactory. When the thickness of the protection layer is 6 nm or less, a magnetic spacing becomes small, and a Signal-to-Noise Ratio (SNR) of the heat-assisted magnetic recording medium 100 improves.

The heat-assisted magnetic recording medium 100 preferably further includes a lubricant layer arranged on the protection layer. The lubricant layer may be made of a fluororesin, such as a perfluoropolyether resin.

The heat-assisted magnetic recording medium 100 in this embodiment may further include another magnetic layer arranged between the underlayer 2 and the first magnetic layer 4 of the magnetic layer 3. This other magnetic layer may be interposed between the underlayer 2 and the first magnetic layer 4, at a position indicated by an arrow in FIG. 1. The provision of this other magnetic layer can further improve the $L1_0$ crystal structure of the first magnetic layer 4. This other magnetic layer may be made of alloys having the $L1_0$ crystal structure, such as Fe—Pt magnetic alloys, Co—Pt magnetic alloys, or the like, for example. In addition, this other magnetic layer, made of such alloys, may include 50 vol % or less of C, $SiO_2$, and BN.

[Magnetic Storage Apparatus]

A magnetic storage apparatus according to one embodiment is not limited to a particular structure, as long as the magnetic storage apparatus includes the heat-assisted magnetic recording medium 100 according to this embodiment.

The magnetic storage apparatus may include a driving mechanism, the magnetic head, a head moving mechanism, and a signal processor. The driving mechanism may drive and rotate the heat-assisted magnetic recording medium having a disk shape, for example. The magnetic head may have a tip end part provided with a near-field light generating element. The magnetic head may further include a laser light generator which heats the heat-assisted magnetic recording medium, and a waveguide which guides laser light generated from the laser light generator to the near-field light generating element. The head moving mechanism may move the magnetic head relative to the heat-assisted magnetic recording medium. The signal processor may process signals to be recorded on the heat-assisted magnetic recording medium by the magnetic head, and signals reproduced from the heat-assisted magnetic recording medium by the magnetic head.

Figure 2:
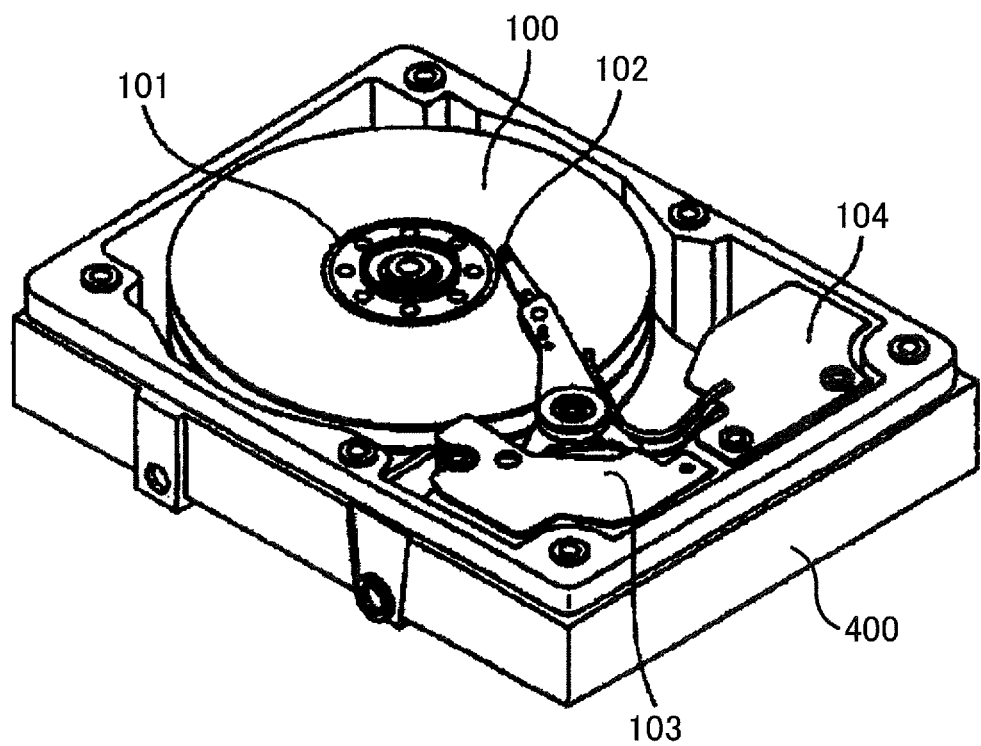
FIG. 2 is a perspective view illustrating an example of a magnetic storage apparatus according to one embodiment of the present invention.

FIG. 2 is a perspective view illustrating an example of the magnetic storage apparatus according to one embodiment of the present invention.

The magnetic storage apparatus illustrated in FIG. 2 includes a plurality of heat-assisted magnetic recording media 100, a driving mechanism 101 which drives the heat-assisted magnetic recording media 100 in a recording direction, a plurality of magnetic heads 102, a head moving mechanism 103 which moves the magnetic heads 102, and a signal processor 104 which are accommodated within a casing 400. In this example, the magnetic storage apparatus employs the heat-assisted recording method. In addition, the plurality of heat-assisted magnetic recording media 100 are heat-assisted magnetic disks employing the heat-assisted recording method. Hence, in this example, the driving mechanism 101 rotates the plurality of heat-assisted magnetic recording media 100, that is, the heat-assisted magnetic disks, in the recording direction.

Figure 3:
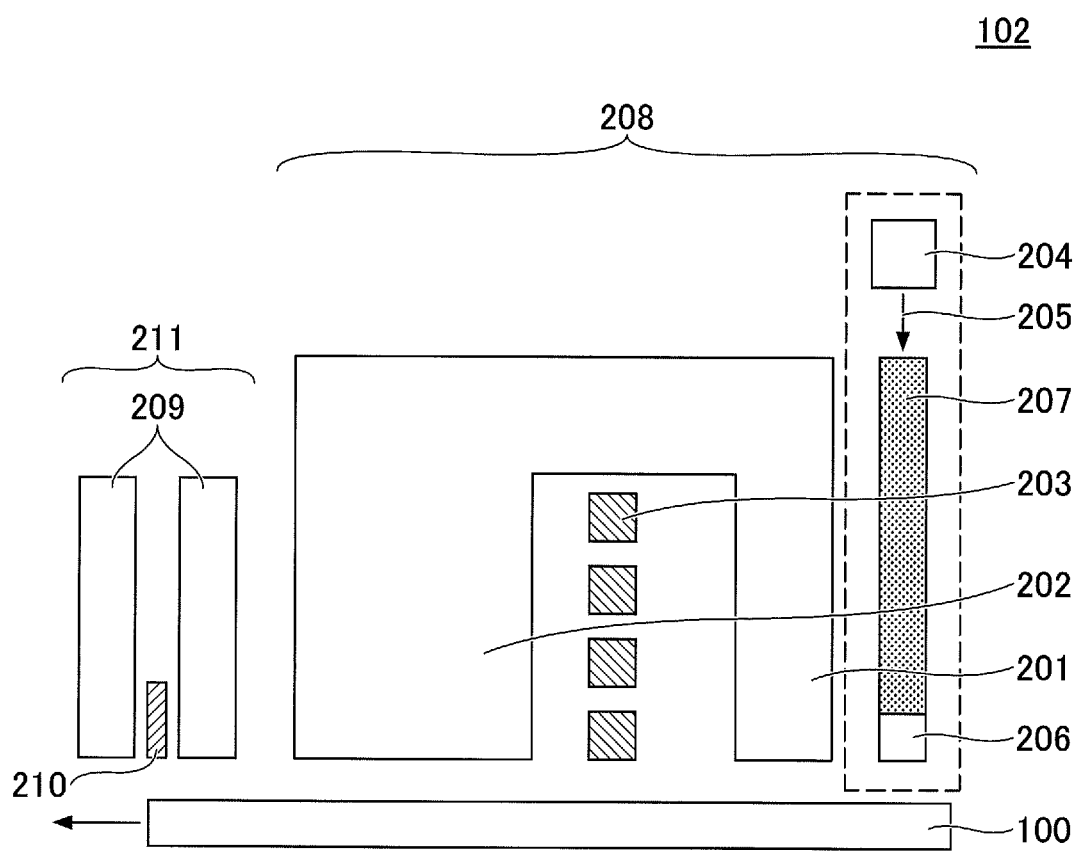
FIG. 3 is a cross sectional view schematically illustrating a structure of an example of a magnetic head used in the magnetic storage apparatus illustrated in FIG. 2.

FIG. 3 is a cross sectional view schematically illustrating a structure of an example of the magnetic head 102 used in the magnetic storage apparatus illustrated in FIG. 2.

The magnetic head 102 includes a recording (or write) head 208 which records (or writes) signals to a corresponding one of the plurality of heat-assisted magnetic recording media 100, and a reproducing (or read) head 211 which reproduces (or reads) signals from the corresponding one of the plurality of heat-assisted magnetic recording media 100.

The recording head 208 includes a main magnetic pole 201, an auxiliary magnetic pole 202, a coil 203 which generates a magnetic field, a laser diode 204 which is an example of the laser generator and generates laser light 205, a near-field light generator (or near-field light generating element) 206 which generates near-field light for heating the heat-assisted magnetic recording medium 100, and a waveguide 207. The waveguide 207 guides the laser light 205 generated from the laser diode 204 to the near-field light generator 206 which is provided at a tip end of the magnetic head 102.

The reproducing head 211 includes a reproducing element 210 which is sandwiched between a pair of shields 209.

[Exemplary Implementations]

Next, exemplary implementations and comparison examples will be described, to facilitate understanding of advantageous effects obtainable by embodiments of the present invention. Of course, the present invention is not limited to the exemplary implementations described below, and the exemplary implementations may be modified where appropriate.

[Exemplary Implementation EI1]

A heat-assisted magnetic recording medium according to an exemplary implementation EI1 was manufactured as follows. A Cr-50 at % Ti alloy layer (underlayer) having a thickness of 100 nm, and a Co-27 at % Fe-5 at % Zr-5 at % B alloy layer (soft magnetic underlayer) were successively foiled on a glass substrate. Next, after heating the glass substrate to a temperature of 250° C., a Cr layer (underlayer)

having a thickness of 10 nm, and a MgO layer (underlayer) having a thickness of 5 nm were successively formed on the Co-27 at % Fe-5 at % Zr-5 at % B alloy layer (soft magnetic underlayer). Further, after heating the glass substrate to a temperature of 450° C., a (Fe-55 at % Pt)-35 vol % C alloy layer (magnetic layer) having a thickness of 0.5 nm, a (Fe-49 at % Pt)-6.8 vol % C-20.8 vol % $SiO_2$-13.3 vol % BN alloy layer (first magnetic layer) having a thickness of 4.5 nm, a (Fe-49 at % Pt)-1.0 vol % C-30.0 vol % $SiO_2$-10.0 vol % BN alloy layer (second magnetic layer) having a thickness of 3 nm, and a carbon (C) layer (protection layer) having a thickness of 3 nm were successively formed on the MgO layer (underlayer), to manufacture the heat-assisted magnetic recording medium.

[Exemplary Implementations EI2-EI31 & Comparison Examples CE1-CE26]

Heat-assisted magnetic recording media according to exemplary implementations EI2 through EI31 and comparison examples CE1 through CE26 were manufactured in the same manner as the heat-assisted magnetic recording medium according to the exemplary implementation EI1, except for compositions of the first magnetic layer and the second magnetic layer which were modified as illustrated in Tables 1 through 4. Table 1 illustrates exemplary implementations EI1 through EI15, and Table 2 illustrates exemplary implementations EI16 through EI31. Table 3 illustrates comparison examples CE1 through CE15, and Table 4 illustrates comparison examples CE16 through CE26.

TABLE 1

| | First Magnetic Layer | | Second Magnetic Layer | | Hc | Ra | SNR |
| | Composition | $SiO_2$/BN | Composition | $SiO_2$/BN | (kOe) | (nm) | (dB) |
|---|---|---|---|---|---|---|---|
| EI1 | (Fe-49 at % Pt)-6.8 vol % C-20.8 vol % $SiO_2$-13.3 vol % BN | 1.6 | (Fe-49 at % Pt)-1.0 vol % C-30.0 vol % $SiO_2$-10.0 vol % BN | 3.0 | 31.72 | 0.43 | 8.5 |
| EI2 | (Fe-49 at % Pt)-8.7 vol % C-5.8 vol % $SiO_2$-15.7 vol % BN | 0.4 | (Fe-49 at % Pt)-1.0 vol % C-30.0 vol % $SiO_2$-10.0 vol % BN | 3.0 | 43.14 | 0.49 | 11.6 |
| EI3 | (Fe-49 at % Pt)-9.9 vol % C-5.1 vol % $SiO_2$-13.5 vol % BN | 0.4 | (Fe-49 at % Pt)-1.0 vol % C-30.0 vol % $SiO_2$-10.0 vol % BN | 3.0 | 41.62 | 0.41 | 11.2 |
| EI4 | (Fe-49 at % Pt)-10.5 vol % C-5.5 vol % $SiO_2$-16.5 vol % BN | 0.3 | (Fe-49 at % Pt)-1.0 vol % C-30.0 vol % $SiO_2$-10.0 vol % BN | 3.0 | 40.19 | 0.47 | 10.8 |
| EI5 | (Fe-49 at % Pt)-11.6 vol % C-6.6 vol % $SiO_2$-13.0 vol % BN | 0.5 | (Fe-49 at % Pt)-1.0 vol % C-30.0 vol % $SiO_2$-10.0 vol % BN | 3.0 | 39.27 | 0.42 | 10.5 |
| EI6 | (Fe-49 at % Pt)-12.2 vol % C-4.9 vol % $SiO_2$-16.9 vol % BN | 0.3 | (Fe-49 at % Pt)-1.0 vol % C-30.0 vol % $SiO_2$-10.0 vol % BN | 3.0 | 38.03 | 0.47 | 10.2 |
| EI7 | (Fe-49 at % Pt)-12.2 vol % C-4.9 vol % $SiO_2$-16.9 vol % BN | 0.3 | (Fe-49 at % Pt)-1.0 vol % C-30.0 vol % $SiO_2$-10.0 vol % BN | 3.0 | 38.03 | 0.47 | 10.2 |
| EI8 | (Fe-49 at % Pt)-5.8 vol % C-9.2 vol % $SiO_2$-25.9 vol % BN | 0.4 | (Fe-49 at % Pt)-1.0 vol % C-30.0 vol % $SiO_2$-10.0 vol % BN | 3.0 | 36.37 | 0.48 | 9.7 |
| EI9 | (Fe-49 at % Pt)-15.1 vol % C-4.2 vol % $SiO_2$-11.8 vol % BN | 0.4 | (Fe-49 at % Pt)-1.0 vol % C-35.0 vol % $SiO_2$-5.0 vol % BN | 7.0 | 35.58 | 0.31 | 9.5 |
| EI10 | (Fe-49 at % Pt)-14.5 vol % C-5.4 vol % $SiO_2$-7.5 vol % BN | 0.7 | (Fe-49 at % Pt)-1.0 vol % C-35.0 vol % $SiO_2$-5.0 vol % BN | 7.0 | 35.50 | 0.23 | 9.5 |
| EI11 | (Fe-49 at % Pt)-13.9 vol % C-10.7 vol % $SiO_2$-5.9 vol % BN | 1.8 | (Fe-49 at % Pt)-1.0 vol % C-37.5 vol % $SiO_2$-2.5 vol % BN | 15.0 | 35.44 | 0.48 | 9.5 |
| EI12 | (Fe-49 at % Pt)-16.4 vol % C-7.5 vol % $SiO_2$-11.8 vol % BN | 0.6 | (Fe-49 at % Pt)-1.0 vol % C-35.0 vol % $SiO_2$-5.0 vol % BN | 7.0 | 34.97 | 0.49 | 9.4 |
| EI13 | (Fe-49 at % Pt)-15.3 vol % C-5.9 vol % $SiO_2$-7.5 vol % BN | 0.8 | (Fe-49 at % Pt)-1.0 vol % C-35.0 vol % $SiO_2$-5.0 vol % BN | 7.0 | 34.95 | 0.25 | 9.4 |
| EI14 | (Fe-49 at % Pt)-16.1 vol % C-9.1 vol % $SiO_2$-10.2 vol % BN | 0.9 | (Fe-49 at % Pt)-1.0 vol % C-35.0 vol % $SiO_2$-5.0 vol % BN | 7.0 | 34.93 | 0.50 | 9.4 |
| EI15 | (Fe-49 at % Pt)-14.5 vol % C-5.8 vol % $SiO_2$-5.4 vol % BN | 1.1 | (Fe-49 at % Pt)-1.0 vol % C-37.5 vol % $SiO_2$-2.5 vol % BN | 15.0 | 34.85 | 0.21 | 9.3 |

TABLE 2

| | First Magnetic Layer | | Second Magnetic Layer | | Hc | Ra | SNR |
| | Composition | $SiO_2$/BN | Composition | $SiO_2$/BN | (kOe) | (nm) | (dB) |
|---|---|---|---|---|---|---|---|
| EI16 | (Fe-49 at % Pt)-15.9 vol % C-7.9 vol % $SiO_2$-6.6 vol % BN | 1.2 | (Fe-49 at % Pt)-1.0 vol % C-37.5 vol % $SiO_2$-2.5 vol % BN | 15.0 | 34.53 | 0.34 | 9.3 |
| EI17 | (Fe-49 at % Pt)-15.8 vol % C-8.1 vol % $SiO_2$-5.6 vol % BN | 1.4 | (Fe-49 at % Pt)-1.0 vol % C-37.5 vol % $SiO_2$-2.5 vol % BN | 15.0 | 34.28 | 0.33 | 9.2 |
| EI18 | (Fe-49 at % Pt)-18.6 vol % C-6.9 vol % $SiO_2$-9.5 vol % BN | 0.7 | (Fe-49 at % Pt)-1.0 vol % C-37.5 vol % $SiO_2$-2.5 vol % BN | 15.0 | 34.11 | 0.44 | 9.1 |
| EI19 | (Fe-49 at % Pt)-7.9 vol % C-18.2 vol % $SiO_2$-16.0 vol % BN | 1.1 | (Fe-49 at % Pt)-1.0 vol % C-30.0 vol % $SiO_2$-10.0 vol % BN | 3.0 | 33.25 | 0.49 | 8.9 |
| EI20 | (Fe-49 at % Pt)-19.1 vol % C-4.3 vol % $SiO_2$-7.0 vol % BN | 0.6 | (Fe-49 at % Pt)-1.0 vol % C-37.5 vol % $SiO_2$-2.5 vol % BN | 15.0 | 33.24 | 0.22 | 8.9 |
| EI21 | (Fe-49 at % Pt)-21.4 vol % C-3.8 vol % $SiO_2$-6.4 vol % BN | 0.6 | (Fe-49 at % Pt)-1.0 vol % C-37.5 vol % $SiO_2$-2.5 vol % BN | 15.0 | 33.13 | 0.26 | 8.9 |
| EI22 | (Fe-49 at % Pt)-19.7 vol % C-6.3 vol % $SiO_2$-5.1 vol % BN | 1.2 | (Fe-49 at % Pt)-1.0 vol % C-37.5 vol % $SiO_2$-2.5 vol % BN | 15.0 | 33.07 | 0.28 | 8.9 |
| EI23 | (Fe-49 at % Pt)-20.1 vol % C-2.5 vol % $SiO_2$-8.0 vol % BN | 0.3 | (Fe-49 at % Pt)-1.0 vol % C-37.5 vol % $SiO_2$-2.5 vol % BN | 15.0 | 32.98 | 0.21 | 8.8 |
| EI24 | (Fe-49 at % Pt)-20.2 vol % C-3.2 vol % $SiO_2$-6.9 vol % BN | 0.5 | (Fe-49 at % Pt)-1.0 vol % C-37.5 vol % $SiO_2$-2.5 vol % BN | 15.0 | 32.92 | 0.19 | 8.8 |

TABLE 2-continued

| | First Magnetic Layer | | Second Magnetic Layer | | Hc | Ra | SNR |
|---|---|---|---|---|---|---|---|
| | Composition | SiO$_2$/BN | Composition | SiO$_2$/BN | (kOe) | (nm) | (dB) |
| EI25 | (Fe-49% Pt)-6.0 vol % C-25.1 vol % SiO$_2$-9.8 vol % BN | 2.6 | (Fe-49 at % Pt)-1.0 vol % C-35.0 vol % SiO$_2$-5.0 vol % BN | 7.0 | 32.34 | 0.44 | 8.7 |
| EI26 | (Fe-49% Pt)-5.1 vol % C-27.1 vol % SiO$_2$-8.6 vol % BN | 3.2 | (Fe-49 at % Pt)-1.0 vol % C-35.0 vol % SiO$_2$-5.0 vol % BN | 7.0 | 31.73 | 0.42 | 8.5 |
| EI27 | (Fe-49% Pt)-11.4 vol % C-22.2 vol % SiO$_2$-8.8 vol % BN | 2.5 | (Fe-49 at % Pt)-1.0 vol % C-35.0 vol % SiO$_2$-5.0 vol % BN | 7.0 | 31.39 | 0.50 | 8.4 |
| EI28 | (Fe-47.5 at % Pt-5 at % Rh)-6.8 vol % C-20.8 vol % SiO$_2$-13.3 vol % BN | 1.6 | (Fe-47.5 at % Pt-5 at % Rh)-1.0 vol % C-30.0 vol % SiO$_2$-10.0 vol % BN | 3.0 | 31.21 | 0.43 | 8.9 |
| EI29 | (Fe-47.5 at % Pt-5 at % Ru)-6.8 vol % C-20.8 vol % SiO$_2$-13.3 vol % BN | 1.6 | (Fe-47.5 at % Pt-5 at % Ru)-1.0 vol % C-30.0 vol % SiO$_2$-10.0 vol % BN | 3.0 | 30.42 | 0.41 | 8.7 |
| EI30 | (Fe-47.5 at % Pt-5 at % Ir)-6.8 vol % C-20.8 vol % SiO$_2$-13.3 vol % BN | 1.6 | (Fe-47.5 at % Pt-5 at % Ir)-1.0 vol % C-30.0 vol % SiO$_2$-10.0 vol % BN | 3.0 | 30.15 | 0.42 | 8.7 |
| EI31 | (Fe-47.5 at % Pt-5 at % Cu)-6.8 vol % C-20.8 vol % SiO$_2$-13.3 vol % BN | 1.6 | (Fe-47.5 at % Pt-5 at % Cu)-1.0 vol % C-30.0 vol % SiO$_2$-10.0 vol % BN | 3.0 | 31.34 | 0.45 | 8.9 |

TABLE 3

| | First Magnetic Layer | | Second Magnetic Layer | | Hc | Ra | SNR |
|---|---|---|---|---|---|---|---|
| | Composition | SiO$_2$/BN | Composition | SiO$_2$/BN | (kOe) | (nm) | (dB) |
| CE1 | (Fe-49 at % Pt)-6.4 vol % C-14.5 vol % SiO$_2$-34.0 vol % BN | 0.4 | (Fe-49 at % Pt)-1.0 vol % C-35.0 vol % SiO$_2$-5.0 vol % BN | 7.0 | 15.68 | 0.14 | 4.2 |
| CE2 | (Fe-49 at % Pt)-3.7 vol % C-20.2 vol % SiO$_2$-26.4 vol % BN | 0.8 | (Fe-49 at % Pt)-1.0 vol % C-35.0 vol % SiO$_2$-5.0 vol % BN | 7.0 | 16.02 | 0.16 | 4.3 |
| CE3 | (Fe-49 at % Pt)-2.8 vol % C-17.7 vol % SiO$_2$-26.4 vol % BN | 0.7 | (Fe-49 at % Pt)-1.0 vol % C-35.0 vol % SiO$_2$-5.0 vol % BN | 7.0 | 22.27 | 0.25 | 6.0 |
| CE4 | (Fe-49 at % Pt)-19.7 vol % SiO$_2$-25.2 vol % BN | 0.8 | (Fe-49 at % Pt)-1.0 vol % C-35.0 vol % SiO$_2$-5.0 vol % BN | 7.0 | 22.45 | 0.27 | 6.0 |
| CE5 | (Fe-49 at % Pt)-0.1 vol % C-21.6 vol % SiO$_2$-22.9 vol % BN | 0.9 | (Fe-49 at % Pt)-1.0 vol % C-35.0 vol % SiO$_2$-5.0 vol % BN | 7.0 | 23.00 | 0.26 | 6.2 |
| CE6 | (Fe-49 at % Pt)-4.7 vol % C-23.7 vol % SiO$_2$-18.6 vol % BN | 1.3 | (Fe-49 at % Pt)-1.0 vol % C-35.0 vol % SiO$_2$-5.0 vol % BN | 7.0 | 23.12 | 0.17 | 6.2 |
| CE7 | (Fe-49 at % Pt)-8.7 vol % C-26.5 vol % SiO$_2$-14.0 vol % BN | 1.9 | (Fe-49 at % Pt)-1.0 vol % C-35.0 vol % SiO$_2$-5.0 vol % BN | 7.0 | 23.14 | 0.30 | 6.2 |
| CE8 | (Fe-49 at % Pt)-24.3 vol % C-6.5 vol % SiO$_2$-13.5 vol % BN | 0.5 | (Fe-49 at % Pt)-1.0 vol % C-35.0 vol % SiO$_2$-5.0 vol % BN | 7.0 | 35.38 | 0.97 | — |
| CE9 | (Fe-49 at % Pt)-11.1 vol % SiO$_2$-27.0 vol % BN | 0.4 | (Fe-49 at % Pt)-1.0 vol % C-35.0 vol % SiO$_2$-5.0 vol % BN | 7.0 | 39.35 | 0.55 | 5.5 |
| CE10 | (Fe-49 at % Pt)-29.4 vol % C-2.0 vol % SiO$_2$-13.5 vol % BN | 0.1 | (Fe-49 at % Pt)-1.0 vol % C-35.0 vol % SiO$_2$-5.0 vol % BN | 7.0 | 37.19 | 1.01 | — |
| CE11 | (Fe-49 at % Pt)-10.6 vol % C-4.2 vol % SiO$_2$-19.8 vol % BN | 0.2 | (Fe-49 at % Pt)-1.0 vol % C-35.0 vol % SiO$_2$-5.0 vol % BN | 7.0 | 38.89 | 0.52 | 5.8 |
| CE12 | (Fe-49 at % Pt)-5.2 vol % SiO$_2$-33.2 vol % BN | 0.2 | (Fe-49 at % Pt)-1.0 vol % C-35.0 vol % SiO$_2$-5.0 vol % BN | 7.0 | 38.39 | 0.63 | 5.3 |
| CE13 | (Fe-49 at % Pt)-6.0 vol % SiO$_2$-32.0 vol % BN | 0.2 | (Fe-49 at % Pt)-1.0 vol % C-35.0 vol % SiO$_2$-5.0 vol % BN | 7.0 | 39.22 | 0.63 | 5.3 |
| CE14 | (Fe-49 at % Pt)-8.2 vol % C-19.4 vol % SiO$_2$-2.1 vol % BN | 9.1 | (Fe-49 at % Pt)-1.0 vol % C-35.0 vol % SiO$_2$-5.0 vol % BN | 7.0 | 37.50 | 1.17 | — |
| CE15 | (Fe-49 at % Pt)-8.7 vol % C-19.6 vol % SiO$_2$-3.8 vol % BN | 5.2 | (Fe-49 at % Pt)-1.0 vol % C-35.0 vol % SiO$_2$-5.0 vol % BN | 7.0 | 37.12 | 1.00 | — |

TABLE 4

| | First Magnetic Layer | | Second Magnetic Layer | | Hc | Ra | SNR |
|---|---|---|---|---|---|---|---|
| | Composition | SiO$_2$/BN | Composition | SiO$_2$/BN | (kOe) | (nm) | (dB) |
| CE16 | (Fe-49 at % Pt)-9.3 vol % C-21.6 vol % SiO$_2$-1.1 vol % BN | 20.0 | (Fe-49 at % Pt)-1.0 vol % C-35.0 vol % SiO$_2$-5.0 vol % BN | 7.0 | 34.65 | 1.17 | — |
| CE17 | (Fe-49 at % Pt)-6.3 vol % C-22.4 vol % SiO$_2$-1.4 vol % BN | 15.8 | (Fe-49 at % Pt)-1.0 vol % C-35.0 vol % SiO$_2$-5.0 vol % BN | 7.0 | 38.18 | 1.39 | — |
| CE18 | (Fe-49 at % Pt)-8.4 vol % C-22.7 vol % SiO$_2$-1.1 vol % BN | 21.0 | (Fe-49 at % Pt)-1.0 vol % C-35.0 vol % SiO$_2$-5.0 vol % BN | 7.0 | 35.09 | 1.23 | — |
| CE19 | (Fe-49 at % Pt)-1.8 vol % C-26.6 vol % SiO$_2$-6.2 vol % BN | 4.3 | (Fe-49 at % Pt)-1.0 vol % C-35.0 vol % SiO$_2$-5.0 vol % BN | 7.0 | 39.55 | 1.05 | — |
| CE20 | (Fe-49 at % Pt)-28.1 vol % SiO$_2$-7.1 vol % BN | 4.0 | (Fe-49 at % Pt)-1.0 vol % C-35.0 vol % SiO$_2$-5.0 vol % BN | 7.0 | 39.13 | 1.02 | — |
| CE21 | (Fe-49 at % Pt)-2.7 vol % C-28.5 vol % SiO$_2$-3.5 vol % BN | 8.2 | (Fe-49 at % Pt)-1.0 vol % C-35.0 vol % SiO$_2$-5.0 vol % BN | 7.0 | 37.30 | 1.17 | — |

TABLE 4-continued

| | First Magnetic Layer | | Second Magnetic Layer | | Hc | Ra | SNR |
|---|---|---|---|---|---|---|---|
| | Composition | SiO$_2$/BN | Composition | SiO$_2$/BN | (kOe) | (nm) | (dB) |
| CE22 | (Fe-49 at % Pt)-2.0 vol % C-28.6 vol % SiO$_2$-2.5 vol % BN | 11.2 | (Fe-49 at % Pt)-1.0 vol % C-35.0 vol % SiO$_2$-5.0 vol % BN | 7.0 | 38.56 | 1.38 | — |
| CE23 | (Fe-49 at % Pt)-30.0 vol % SiO$_2$-4.4 vol % BN | 6.8 | (Fe-49 at % Pt)-1.0 vol % C-35.0 vol % SiO$_2$-5.0 vol % BN | 7.0 | 38.37 | 1.23 | — |
| CE24 | (Fe-49% Pt)-6.8 vol % C-20.8 vol % SiO$_2$-13.3 vol % BN | 1.6 | (Fe-49 at % Pt)-6.8 vol % C-20.8 vol % SiO$_2$-13.3 vol % BN | 1.6 | 32.70 | 0.39 | 6.5 |
| CE25 | (Fe-49% Pt)-6.8 vol % C-20.8 vol % SiO$_2$-13.3 vol % BN | 1.6 | (Fe-49 at % Pt)-20.2 vol % C-3.2 vol % SiO$_2$-6.9 vol % BN | 0.5 | 33.00 | 0.43 | 6.1 |
| CE26 | (Fe-49% Pt)-6.8 vol % C-20.8 vol % SiO$_2$-13.3 vol % BN | 1.6 | (Fe-49 at % Pt)-3.4 vol % C-14.1 vol % SiO$_2$-22.1 vol % BN | 0.6 | 34.70 | 0.38 | 6.3 |

[Arithmetic Average Roughness Rn]

An Atomic Force Microscope (AFM) was used to measure an arithmetic average roughness Rn of the heat assisted magnetic recording medium.

[Coercivity Hc]

A Kerr magnetometer, manufactured by Neoark Corporation, was used to measure a coercivity Hc of the heat-assisted magnetic recording medium before forming the protection layer.

[SNR of Electromagnetic Conversion Characteristic]

The magnetic head 102 illustrated in FIG. 3 was used to record signals at a linear recording density of 1600 kilo Flux Changes per Inch (kFCI), and the SNR of the heat-assisted magnetic recording medium was measured.

Tables 1 through 4 illustrate measured results of the coercivity Hc, the arithmetic average roughness Rn, and the SNR for the heat-assisted magnetic recording media according to the exemplary implementations EI1 through EI31 and the comparison examples CE1 through CE26. In Tables 1 through 4, "SiO$_2$/BN" indicates a volume ratio of SiO$_2$ with respect to BN.

It was confirmed that the heat-assisted magnetic recording media according to the exemplary implementations EI1 through EI31 have an excellent SNR.

On the other hand, in the heat-assisted magnetic recording media according to the comparison examples CE1 and CE7, the volume fraction of the grain boundaries of the first magnetic layer is in a range of 49.2 vol % to 54.9 vol %, and thus, the coercivity Hc becomes less than 25 kOe, and the SNR deteriorates.

In the heat-assisted magnetic recording media according to the comparison examples CE2 and CE3, the volume fraction of the grain boundaries of the first magnetic layer is in a range of 46.9 vol % to 50.3 vol %, and the volume fraction of C in the first magnetic layer is in a range of 2.8 vol % to 3.7 vol %, and thus, the coercivity Hc becomes less than 25 kOe, and the SNR deteriorates.

In the heat-assisted magnetic recording media according to the comparison examples CE4 through CE6, the volume fraction of C in the first magnetic layer is in a range of 0 vol % to 3.7 vol %, and thus, the coercivity Hc becomes less than 25 kOe, and the SNR deteriorates.

In the heat-assisted magnetic recording medium according to the comparison example CE8, the volume fraction of C in the first magnetic layer is 24.3 vol %, and thus, the arithmetic average roughness Rn becomes 0.97 nm, and the SNR cannot be measured.

In the heat-assisted magnetic recording medium according to the comparison example CE9, the first magnetic layer does not include C, and thus, the arithmetic average roughness Rn becomes greater than 0.5 nm, and the SNR deteriorates.

In the heat-assisted magnetic recording medium according to the comparison example CE10, the volume fraction of C in the first magnetic layer is 29.4 vol %, and the volume ratio of SiO$_2$ with respect to BN in the first magnetic layer is 0.1, and thus, the arithmetic average roughness Rn becomes 1.01 nm, and the SNR cannot be measured.

In the heat-assisted magnetic recording medium according to the comparison example CE11, the volume ratio of SiO$_2$ with respect to BN in the first magnetic layer is 0.2, and thus, the arithmetic average roughness Rn becomes greater than 0.5 nm, and the SNR deteriorates.

In the heat-assisted magnetic recording media according to the comparison examples CE12 and CE13, the volume ratio of SiO$_2$ with respect to BN in the first magnetic layer is 0.2, and the first magnetic layer does not include C, and thus, the arithmetic average roughness Rn becomes greater than 0.5 nm, and the SNR deteriorates.

In the heat-assisted magnetic recording media according to the comparison examples CE14 through CE23, the volume ratio of SiO$_2$ with respect to BN in the first magnetic layer is in a range of 4.0 to 21.0, and thus, the arithmetic average roughness Rn becomes in a range of 1.00 nm to 1.39 nm, and the SNR cannot be measured.

In the heat-assisted magnetic recording media according to the comparison examples CE24 and CE26, the volume fraction of SiO$_2$ in the second magnetic layer is less than or equal to the volume fraction of SiO$_2$ in the first magnetic layer, and the volume fraction of BN in the second magnetic layer is greater than or equal to the volume fraction of BN in the first magnetic layer, and thus, the heat dissipation deteriorates, and the SNR deteriorates.

In the heat-assisted magnetic recording medium according to the comparison example CE25, the volume fraction of SiO$_2$ in the second magnetic layer is less than or equal to the volume fraction of SiO$_2$ in the first magnetic layer, and thus, the heat dissipation deteriorates, and the SNR deteriorates.

According to the embodiments and exemplary implementations, it is possible to provide a heat-assisted magnetic recording medium having an excellent electromagnetic conversion characteristic, and a magnetic storage apparatus including the heat-assisted magnetic recording medium.

Although the exemplary implementations are numbered with, for example, "first," "second," "third," etc., the ordinal numbers do not imply priorities of the exemplary implementations.

Further, the present invention is not limited to these embodiments and exemplary implementations, but various variations and modifications may be made without departing from the scope of the present invention.

What is claimed is:

1. A heat-assisted magnetic recording medium comprising:
    a substrate, an underlayer, and a magnetic layer including an alloy having a L1$_0$ crystal structure, which are arranged in this order, wherein the magnetic layer includes a first magnetic layer, and a second magnetic layer which is arranged farther away from the substrate than the first magnetic layer, wherein each of the first magnetic layer and the second magnetic layer has a granular structure including C, $SiO_2$, and BN at grain boundaries, wherein a volume fraction of the grain boundaries in each of the first magnetic layer and the second magnetic layer is within a range of 25 vol % to 45 vol %, wherein a volume fraction of C in the first magnetic layer is within a range of 5 vol % to 22 vol %, wherein a volume ratio of $SiO_2$ with respect to BN in each of the first magnetic layer and the second magnetic layer is within a range of 0.25 to 3.5, wherein a volume fraction of $SiO_2$ in the second magnetic layer is greater than a volume fraction of $SiO_2$ in the first magnetic layer by 5 vol % or more, and wherein a volume fraction of BN in the second magnetic layer is smaller than a volume fraction of BN in the first magnetic layer by 2 vol % or more.

2. The heat-assisted magnetic recording medium as claimed in claim 1, wherein
each of the first magnetic layer and the second magnetic layer has a thickness of 2 nm or greater, and
the second magnetic layer has a thickness smaller than that of the first magnetic layer.

3. The heat-assisted magnetic recording medium as claimed in claim 2, wherein the alloy having the $L1_0$ crystal structure includes one or more metals selected from a group consisting of Rh, Ru, Ir, and Cu, within a range of 2 mol % to 10 mol %.

4. The heat-assisted magnetic recording medium as claimed in claim 1, wherein the alloy having the $L1_0$ crystal structure includes one or more metals selected from a group consisting of Rh, Ru, Ir, and Cu, within a range of 2 mol % to 10 mol %.

5. A magnetic storage apparatus comprising:
the heat-assisted magnetic recording medium according to claim 1; and
a magnetic head configured to write information to and read information from the heat-assisted magnetic recording medium.

6. A magnetic storage apparatus comprising:
a heat-assisted magnetic recording medium;
a magnetic head configured to write information to and read information from the heat-assisted magnetic recording medium; and
a casing configured to accommodate the heat-assisted magnetic recording medium and the magnetic head, wherein the magnetic head includes a laser light generator configured to generate laser light, a waveguide configured to guide the laser light to a tip end of the magnetic head, and a near-field light generator configured to generate near-field light which heats the magnetic recording medium, wherein the heat-assisted magnetic recording medium includes a substrate, an underlayer, and a magnetic layer including an alloy having a $L1_0$ crystal structure, which are arranged in this order, wherein the magnetic layer includes a first magnetic layer, and a second magnetic layer which is arranged farther away from the substrate than the first magnetic layer, wherein each of the first magnetic layer and the second magnetic layer has a granular structure including C, $SiO_2$, and BN at grain boundaries, wherein a volume fraction of the grain boundaries in each of the first magnetic layer and the second magnetic layer is within a range of 25 vol % to 45 vol %, wherein a volume fraction of C in the first magnetic layer is within a range of 5 vol % to 22 vol %, wherein a volume ratio of $SiO_2$ with respect to BN in each of the first magnetic layer and the second magnetic layer is within a range of 0.25 to 3.5, wherein a volume fraction of $SiO_2$ in the second magnetic layer is greater than a volume fraction of $SiO_2$ in the first magnetic layer by 5 vol % or more, and wherein a volume fraction of BN in the second magnetic layer is smaller than a volume fraction of BN in the first magnetic layer by 2 vol % or more.

7. The magnetic storage apparatus as claimed in claim 6, wherein
each of the first magnetic layer and the second magnetic layer of the heat-assisted magnetic recording medium has a thickness of 2 nm or greater, and
the second magnetic layer has a thickness smaller than that of the first magnetic layer.

8. The magnetic storage apparatus as claimed in claim 7, wherein the alloy having the $L1_0$ crystal structure, included in the magnetic layer of the heat-assisted magnetic recording medium, includes one or more metals selected from a group consisting of Rh, Ru, Ir, and Cu, within a range of 2 mol % to 10 mol %.

9. The magnetic storage apparatus as claimed in claim 6, wherein the alloy having the $L1_0$ crystal structure, included in the magnetic layer of the heat-assisted magnetic recording medium, includes one or more metals selected from a group consisting of Rh, Ru, Ir, and Cu, within a range of 2 mol % to 10 mol %.

\* \* \* \* \*